United States Patent [19]

Valdiserri et al.

[11] 4,331,585

[45] May 25, 1982

[54] LIGHT-STABLE POLYPROPYLENE COMPOSITIONS

[75] Inventors: Leo L. Valdiserri, Belpre, Ohio; Elyse M. Bullock, Parkersburg, W. Va.

[73] Assignee: Borg-Warner Chemicals, Inc., Parkersburg, W. Va.

[21] Appl. No.: 152,468

[22] Filed: May 23, 1980

Related U.S. Application Data

[63] Continuation of Ser. No. 3,675, Jan. 15, 1979, abandoned.

[51] Int. Cl.³ .......................... C08K 5/34; C08K 5/52

[52] U.S. Cl. ................................... 524/103; 524/102; 524/120; 524/119

[58] Field of Search ................... 260/45.8 NP, 45.8 R

[56] References Cited

U.S. PATENT DOCUMENTS 3,737,485  6/1973  Hechenbleikner .............. 260/927 R
4,110,306  8/1978  Minagawa et al. ......... 260/45.8 NP

*Primary Examiner*—Lorenzo B. Hayes
*Assistant Examiner*—R. A. White
*Attorney, Agent, or Firm*—Joseph Shekleton

[57] ABSTRACT

Light-stable polypropylene fibers containing a combination of a hindered piperidinyl compound and a pentaerythritol polyphosphite.

3 Claims, No Drawings

LIGHT-STABLE POLYPROPYLENE COMPOSITIONS

This is a continuation of application Ser. No. 3,675 filed Jan. 15, 1979, now abandoned.

BACKGROUND OF THE INVENTION

The invention of this application relates, as indicated, to polypropylene compositions. More particularly, it relates to such compositions which are stabilized against deterioration that ordinarily results from prolonged exposure to sunlight. Still more particularly, it relates to the stabilization of polypropylene compositions by means of the combination of small proportions of additives.

Ultraviolet light has a degradative effect upon olefin polymers, the severity of which is dependent primarily on the degree of exposure. The effect is especially severe on polypropylene, probably because of the high concentration of tertiary carbon atoms which are peculiarly susceptible to oxidative attack.

Ordinarily, polypropylene is characterized by high tensile strength, i.e., higher than that of other olefin polymers, as well as by high abrasion resistance and a lustrous surface which is resistant to acid, alkali, solvent and other chemical attack. It is also very light in weight, i.e., it has a specific gravity of about 0.90. All of these physical properties, plus the fact that, as a fiber, it can be oriented so as to significantly increase its tensile strength, are highly desirable and, as expected, it finds wide usage in many applications.

Unfortunately, these desirable qualities are accompanied by a tendency of the polypropylene to deteriorate rapidly by means of photooxidation upon exposure to sunlight. The result is discoloration, reduced molecular weight and embrittlement. It is accordingly necessary to stabilize the polymer against such deterioration, and this is done by the addition of small amounts of chemical agents which are effective for this purpose. Hydroxybenzophenones, hydroxyphenylbenzotriazoles and phenylsalicylates are thus effective and are used in this manner. They operate by absorbing harmful ultraviolet energy and reemitting it at a different energy level which does not adversely affect the polymer.

The relative instability of polypropylene is due to the presence of tertiary carbon atoms in the polymer chain; these are subject to oxidative attack which is catalyzed by heat and light. In the case of fiber compositions, for example, light is an especially important factor because of the relatively large amount of surface area of the polypropylene.

Japanese Pat. No. 66551/77 (Application No. 144,357/50) shows the stabilization of certain synthetic resins, including polypropylene, by the combination of a substituted piperidine, a triorganophosphite and a secondary organophosphite. The secondary organophosphite is an essential component of the stabilizer combination.

U.S. Pat. No. 3,640,928 (Murayama et al.), which deals with the stabilization of a wide variety of synthetic polymers, shows the use of certain piperidine derivatives for that purpose. Included among such piperidine derivatives is bis(2,2,6,6-tetramethyl-4-piperidyl)adipate. It is stated that these compounds can be used alone or in combination with other known stabilizers, fillers, pigments and the like. U.S. Pat. No. 3,840,494 (Murayama et al.) shows much the same thing.

West German Pat. No. 25 00 314 deals with the stabilization of pigmented polyolefin compositions. Stabilization is accomplished by means of cyclic di-tert-alkylamines; these are defined very broadly and illustrated profusely, and include bis-(2,2,6,6-tetramethyl-4-piperidinyl-1-oxyl)-sebacate (see page 15). It is also stated that these cyclic di-tert-amines can be used for their intended purpose in combination with other known additives.

SUMMARY OF THE INVENTION

The invention of this application is a light-stable polypropylene composition comprising polypropylene and minor proportions sufficient to improve the light stability of said polypropylene of each of a piperidinyl compound having the formula

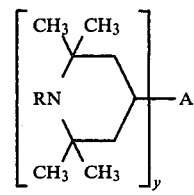

where R is alkyl of 1-4 carbon atoms or hydrogen, y is 1-4 and A is an organic radical for a phosphorus acid residue, and a pentaerythritol polyphosphite. The organic radical or phosphorous acid residue may be an ester, carbonate, ether, thiocarbonate, sulfinate, sulfonate, phosphite or phosphate radical, as shown more particularly in U.S. Pat. No. 3,640,928.

More narrowly, the invention comprises polypropylene compositions containing a piperidinyl compound having the formula

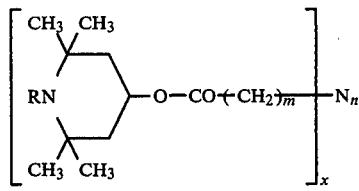

where R is alkyl of 1-4 carbon atoms or hydrogen, m is 1-4, x is 2-3 and n is 0 or 1, and a pentaerythritol polyphosphite.

DESCRIPTION OF THE SPECIFIC EMBODIMENTS

It will be noted that the above piperidinyl compound may comprise three substituted piperidinyl groups bound to one another through a nitrogen atom, as well as one where two substituted piperidinyl groups are bound to one another through the residue of an aliphatic dicarboxylic acid. In the first instance, such a compound may be prepared by the reaction of a lower alkyl ester of a tricarboxylic acid having the formula

where m is 1-4, with 4-hydroxy-2,2,6,6-tetramethylpiperidine.

In the other instance, the piperidinyl compound of the invention may be prepared by reaction of a di-(lower)alkyl dicarboxylate with the 4-hydroxy-2,2,6,6-tetramethylpiperidine. Illustrative di-(lower)alkyl dicarboxylates include dimethyl and diethyl, glutarates, suberates, sebacates, adipates and pimelates. The methods of preparation shown in the above Murayama et al. patents are suitable here.

The pentaerythritol polyphosphite preferably is a dialkyl pentaerythritol diphosphite. It may be prepared by the reaction of pentaerythritol and two mols of triphenyl phosphite, followed by transesterification of the resulting diphenyl pentaerythritol diphosphite with a relatively non-volatile alcohol such as stearyl alcohol. Other suitable pentaerythritol polyphosphites may be prepared by reacting various proportions of pentaerythritol and triphenyl phosphite with one another. Thus, the reaction of three mols of pentaerythritol and four mols of triphenyl phosphite results in tripentaerythritol tetraphosphite, i.e., a product wherein all of the phosphorus valences are attached through oxygen to a pentaerythritol residue. It will be understood that products of this type, being derived from two polyfunctional reactants, are necessarily a mixture of several products and that the term "product" is used herein to designate the product obtained in principal amounts.

Other proportions of the above two reactants may be employed to obtain, on the one hand, products having free hydroxyl groups attached to the pentaerythritol residue and, on the other hand, products having unreacted phenyl ester groups; these phenyl ester groups can, of course, be transesterified with relatively non-volatile alcohols such as stearyl alcohol, dodecyl alcohol, decyl alcohol and the like.

The details of method of preparation of these pentaerythritol polyphosphites may be gleaned from the disclosures of U.S. Pat. Nos. 3,205,250; 3,281,381; 3,310,609; and 3,928,505.

The piperidinyl compound of the invention should be used in concentrations ranging from about 0.03% to about 1.0% based on the polypropylene content. The pentaerythritol polyphosphite should be used in concentrations ranging from about 0.05% to about 1.0% on the same basis.

The piperidinyl compounds herein are known to impart good ultraviolet stability to polymer compositions. Unfortunately, they are expensive because of the number of processing steps required in their manufacture. The invention of this application permits substitution of a much less expensive additive, viz., the pentaerythritol polyphosphite, for a large proportion, i.e., up to about 75%, of the piperidinyl compound, without loss of ultraviolet stabilizing activity. As a matter of fact, in many instances there is a considerable increase in such activity upon addition of the pentaerythritol polyphosphite.

Other stabilizing agents can be added to the polypropylene compositions herein. These include neutralizers such as metal oxides and metal salts of higher molecular weight carboxylic acids such as calcium stearate, barium laurate, etc.; phenolic oxidation inhibitors such as those described in U.S. Pat. Nos. 3,285,855; 3,644,482; and 3,531,483; and various fillers, pigments, etc.

The efficacy of the polypropylene compositions of the invention is shown by data collected from tests carried out on 200/16 denier natural polypropylene multifilament. The fiber compositions are prepared by dry blending the various components and then extruding the mixture at 475° F. Fibers are spun at 540° F., drawn at a ratio of 7:1 and given one twist per inch. The test consists of exposure of the test fiber to conditions of ordinary weather in the Caribbean. The tensile strength of the fiber is measured at periodic intervals and the percent retention of the original tensile strength after 140 kilolangleys ("KL") is taken as a measure of the resistance of the fiber to deterioration. Test data for various polypropylene fibers are shown in the following table. Each fiber composition contains 100 parts of polypropylene, 0.05 phr (parts per hundred parts of resin) of calcium stearate, 0.15 phr of octadecyl 3-(4-hydroxy-3,5-ditertiarybutylphenyl)propionate and the indicated amounts (phr) of other additives.

TABLE

| | A | B | C | D | % Retention of Tensile Strength after 140 KL |
|---|---|---|---|---|---|
| 1. | 0.2 | | | | 43 |
| 2. | 0.4 | | | | 56 |
| 3. | | | 0.2 | | 0 (at 44 KL) |
| 4. | 0.2 | | 0.2 | | 74 |
| 5. | 0.3 | | | 0.1 | 64 |
| 6. | | 0.3 | 0.3 | | 90 |
| 7. | | 0.2 | | | 0 (at 96 KL)* |
| 8. | | | 0.3 | | 0 (at 48 KL)* |
| 9. | 0.6 | | | | 64 |

A: bis-(2,2,6,6-tetramethyl-4-piperidyl)sebacate
B: tris-(2,2,6,6-tetramethyl-4-piperidyl)nitriloacetate
C: distearyl pentaerythritol diphosphite
D: tripentaerythritol tetraphosphite
*extrapolated values It will be seen that test fiber samples Nos. 4, 5 and 6, representing the combination of the claims, are rated quite high. Moreover, No. 5 is rated as high (64) as No. 9 (64), although it has a lower overall additive content. Likewise, No. 4 is rated higher (74) than No. 2 (56), with which it is directly comparable. So also, No. 5 is rated higher (64) than No. 2 (56).

All parts and percentages herein, unless otherwise expressly stated, are by weight.

We claim:

1. A light-stable polypropylene fiber composition consisting essentially of polypropylene and minor proportions sufficient to improve the light stability of said polypropylene of each of (1) either bis-(2,2,6,6-tetramethyl-4-piperidyl) sebacate or tris-(2,2,6,6-tetramethyl-4-piperidyl) nitriloacetate, and (2) a pentaerythritol polyphosphite.

2. The light-stable polypropylene composition of claim 1 wherein the pentaerythritol polyphosphite is distearyl pentaerythritol diphosphite.

3. The light-stable polypropylene composition of claim 1 wherein the pentaerythritol polyphosphite is tripentaerythritol tetraphosphite.

* * * * *